Sept. 22, 1936.   L. G. KNAPP   2,054,824
WATER SYSTEM UNIT
Filed Aug. 21, 1933   2 Sheets-Sheet 1

Inventor:
Leland G. Knapp,
By Rommel Grace & Warden Attys

Sept. 22, 1936.　　　　L. G. KNAPP　　　　2,054,824
WATER SYSTEM UNIT
Filed Aug. 21, 1933　　　2 Sheets-Sheet 2
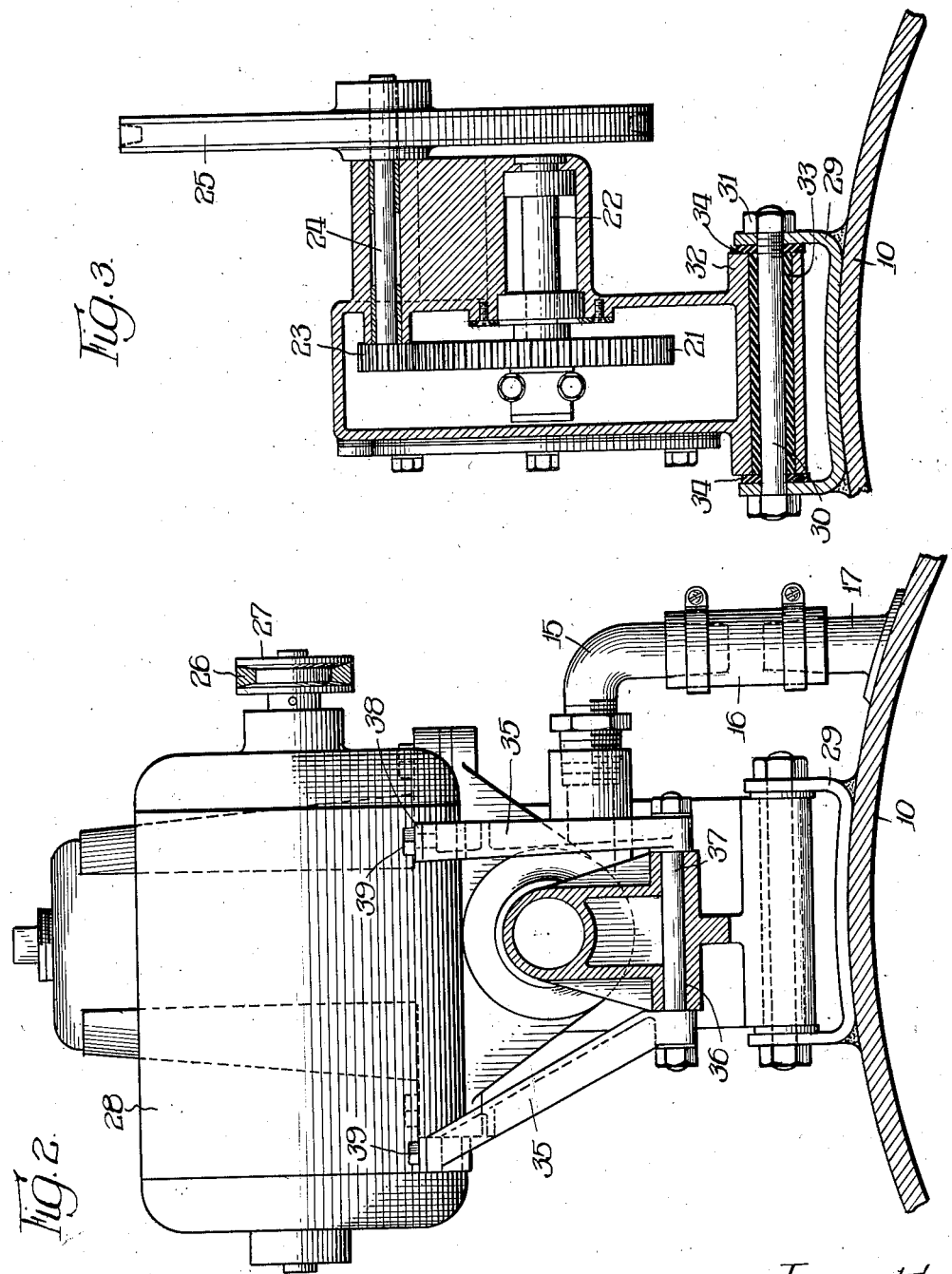
Inventor:
Leland G. Knapp, Patented Sept. 22, 1936

2,054,824

UNITED STATES PATENT OFFICE 2,054,824

WATER SYSTEM UNIT

Leland G. Knapp, Chicago, Ill., assignor to Montgomery Ward & Co., Incorporated, Chicago, Ill., a corporation of Illinois Application August 21, 1933, Serial No. 686,112

6 Claims. (Cl. 103—205)

The present invention has to do with water supply systems of the domestic type, such as commonly employed in rural districts and in municipalities where no provision is made for supplying water from a central source.

Systems of the type referred to include a storage tank, a pump for maintaining the tank supplied with water from a well or like source, and a suitable prime mover for operating the pump. In the organization of these units the pump and prime mover usually are mounted on the storage tank for economy of space. Because of this the movements of the mechanism are transmitted to the tank, thus imparting the vibration of the moving parts to the tank, as well as the noise of such moving parts. Undue wear and loosening of the parts inevitably follow, and the noises set up become intensified and extremely objectionable.

The present invention aims to overcome the conditions referred to. It provides a water supply unit comparatively free from vibrations and in which those vibrations which arise are absorbed and not transmitted to the storage tank. The noises of the operating parts likewise are absorbed so that the apparatus operates quietly and without objectionable sound, the whole apparatus being damped and prevented from magnifying or intensifying such sounds as are inherently present in apparatus of this character.

Other objects and advantages will appear as the nature of the improvements is better understood, the invention consisting substantially in the novel construction, combination and arrangement of parts hereinafter fully described, illustrated in the accompanying drawings, and finally pointed out in the appended claims.

While the form of the invention herein shown and described is believed to be a practical embodiment thereof, the invention is not to be restricted to such form, it being obvious that the same is susceptible of change, modification and variation, so that the present disclosure is to be taken in an illustrative sense rather than imposing restrictions on the invention.

In the drawings,

Fig. 2 is a vertical transverse sectional view on the line 2—2 of Fig. 1;

Fig. 3 is a similar view on the line 3—3, Fig. 1.

Figure 1:
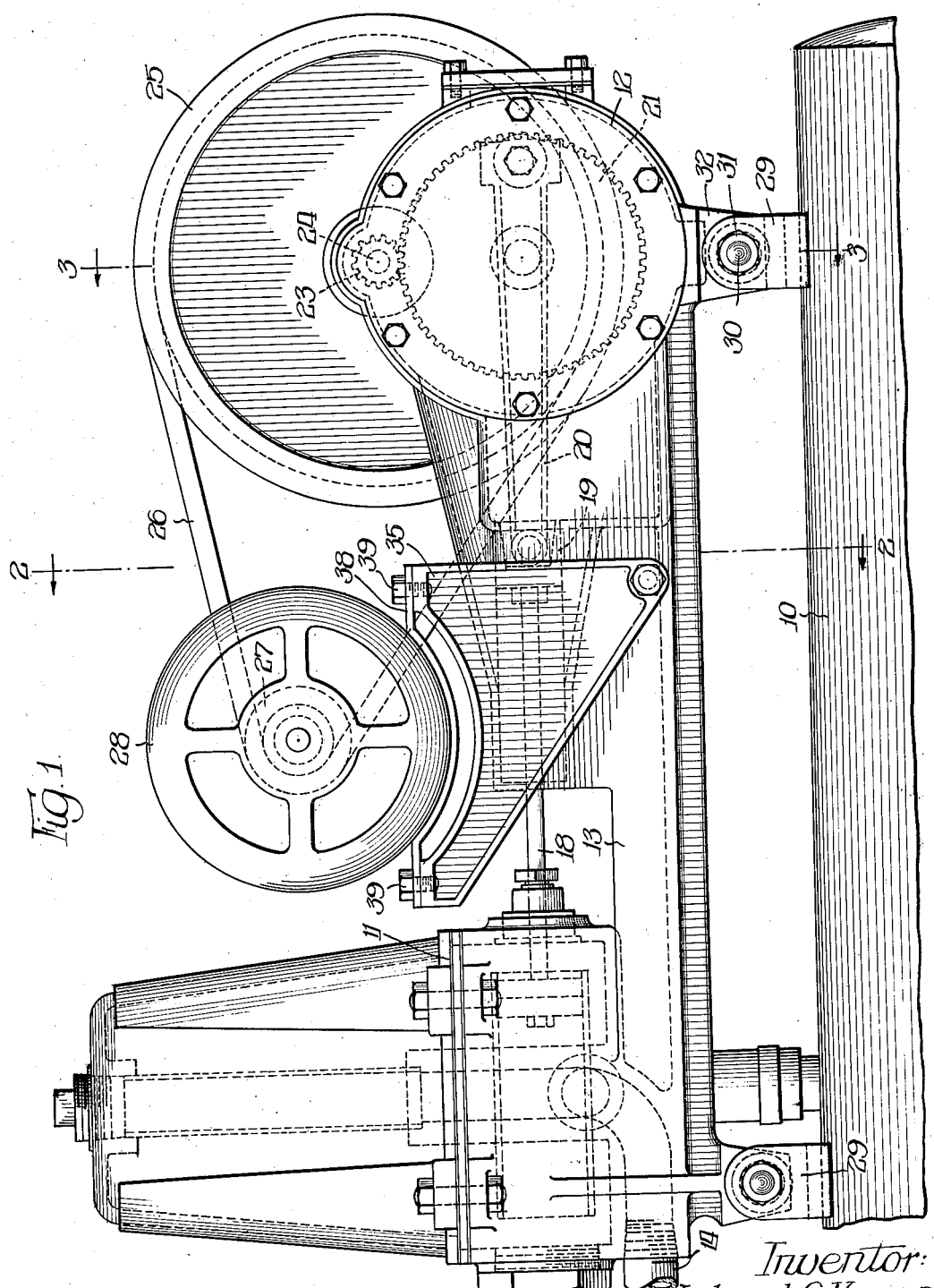
Fig. 1 is a side elevation of a water system unit constructed in accordance with the present invention, certain of the operative parts being illustrated in dotted lines in order to more clearly disclose the general arrangement of the parts.

Referring now in detail to the accompanying drawings, the numeral 10 designates the storage tank of a water supply unit, this tank being shown in a fragmentary way. It is the usual metallic tank, generally cylindrical in form, and of the capacity necessary for holding the desired quantity of water for the needs of the system.

The pump of the unit includes a pump head 11 and a power head 12 mounted on a common base 13. The pumping mechanism may be of any approved form, but as shown the pump head 11 is of the double acting type, having an inlet 14 which is connected to a suitable source of water supply, and an outlet 15 connected through the medium of a rubber hose or sleeve 16 to a nipple 17 carried by the tank 10.

The piston rod 18 is connected to the usual cross head 19 having a connecting rod 20 associated therewith, and said connecting rod is also connected to a crank disk 21 arranged within the case of the pump unit and carried by a shaft 22. The crank disk 21 preferably is in the form of a gear wheel, the teeth of which are in mesh with a driving pinion 23 mounted on the inner end of a driving shaft 24. At the outer end of said shaft 24 is a driving wheel 25 over which is trained a driving belt 26 connected to the pulley 27 of an electric motor 28. This motor constitutes the prime mover of the herein described unit.

To mount the pumping mechanism upon the storage tank 10 a pair of U shaped supporting yokes 29 is employed. These yokes are suitably connected to the storage tank 10 in any appropriate manner, such as by brazing or spot welding. A connecting bolt 30 passes through the ends of each of the supporting yokes 29, being held therein by fastening nuts 31. At each end of the base of the pumping mechanism is arranged a transversely-extending sleeve 32 which fits between the ends of one of the supporting yokes 29. Within each of the sleeves 32 is an elastic bushing 33, preferably in the form of a section of rubber tubing. It is of a diameter to fit the bore of the sleeve 32 and extends throughout the length of that bore. The bushing 33 receives the connecting bolt 30, so that there is no metallic contact between the bolt 30 and the sleeve 32.

Surrounding each end of the bolt 30 is a rubber washer 34, these washers being interposed between the ends of the supporting yokes 29 and the ends of the sleeve 32. By so arranging the washers 34 metallic contact between the sleeve 32 and its supporting bracket 29 is avoided. It will thus be seen that the vibrations set up in the pumping mechanism, due to the operation of the pump head and the power head, are prevented being transmitted through the sleeves 32 and the supporting brackets 29 to the storage tank 10. The pumping mechanism, therefore, is cushioned, the vibrations are taken up by the elastic bushings 33 and the washers 34, and the sounds of the operating parts of the pumping mechanism likewise are taken up by the elastic bushings and washers and become damped, thus freeing the operation of the water supply unit from the noises that inherently arise and become intensified, in the ordinary constructions of these units, by being transmitted to the storage tank of the unit.

It will also be observed that the rubber hose or sleeve 16, which is interposed between the outlet 15 of the pump and the nipple 17 of the storage tank 10, serves not only as a pipe connection, but because of the fact that it is constructed of rubber it will also act to absorb any vibrations of the pumping mechanism, and prevent passage of these vibrations to the storage tank 10. Likewise, the hose or sleeve 16 will absorb the operating noises of the pumping mechanism, so that these noises are not transmitted through the outlet 15 and nipple 17 to the tank 10.

Obviously, the pumping mechanism is insulated from the tank 10 both as to transmission of sound and vibrations, with the result that the construction herein shown and described serves to provide a water supply unit in which the noise of operation is reduced to the minimum and dampened to such an extent as to be free from objection.

It is to be noted that the motor 28 is mounted in a plane above the pump and power heads, and at a point in the space intermediate the same. This positions the motor 28 most advantageously as to accessibility and in economy of space with respect to the pumping mechanism, so that the latter may be organized in compact form. To sustain the motor 28 in the position referred to, a pair of substantially triangular shaped supporting brackets 35 is employed, one of these brackets being arranged at each side of the base 13 of the pumping mechanism. The lower end or apex of each of the brackets 35 is perforated, these perforated ends being in registry with a transversely-extending passage 36 formed in the base 13 of the pumping mechanism adjacent to its bottom, and mounted in said passage 36 is a hinge bolt 37 the head and nut of which embrace the outer faces of the supporting brackets 35, and thereby said supporting brackets are mounted for hinged movement on the supporting base 13. The brackets 35 constitute a support for the motor 28, which support straddles the base 13 and sets relatively low on the base.

The motor 28 has a pair of fastening members 38 attached thereto, one of said fastening members being bolted, or otherwise suitably detachably connected to each of the supporting brackets 35, as at 39. The motor 28 is thereby securely fastened to the supporting brackets 35, and due to the fact that the weight of the motor is exerted on the brackets 35 at a point out of line with the vertical plane of the hinge bolt 37, the weight of the motor 28 is exerted normally to swing the supporting brackets 35 downwardly and away from the driving shaft 24 and the driving wheel 25 carried thereby. In this manner gravity is utilized to maintain the driving belt 26 always properly tensioned, but permit the supporting brackets 35 to swing upon the hinge bolt 37, and thus compensate for yield between the motor 28 and the driving wheel 25 when the pumping mechanism is in operation. No springs or other compensating devices, therefore, are necessary. Furthermore, when it is desired to remove the driving belt 26 from the driving wheel 25 and the pulley 27, the motor 28 may be moved toward the driving wheel to the desired extent for freeing the belt 26 from engagement therewith and with the pulley 27.

While the supporting brackets 35 are hingedly connected by the bolt 37 at a point adjacent to the bottom of the base 13, their upper ends extend above the plane of the pump head 11 and the power head 12. This permits the motor 28 to be mounted on the brackets in close relation to the base, but capable of free rocking movement with the brackets in relation to the base and still be easily accessible.

From the foregoing it is apparent that the herein described invention provides a water system unit wherein the vibrations of the pumping mechanism are absorbed and prevented being transmitted to the storage tank, and in which the noise of the operating parts is absorbed and dampened to such an extent as to free the same from objection. Moreover, the organization of the parts is such as to give a compact assembly thereof and economize in the space required for such assembly.

I claim:

1. In a water system unit of the class described, a pumping mechanism including a pump head and a power head, a motor arranged in the space between the pump head and the power head and flexibly geared to the power head, a support for said motor including a pair of substantially triangular supporting brackets arranged at opposite sides of said pumping mechanism and hingedly connected to the pumping mechanism, an apex of each of said supporting brackets constituting the hinged point, and means for connecting the supporting brackets to the pumping mechanism at such points, the center of gravity of the motor being in a different vertical plane from the hinged points of said supporting brackets, whereby the weight of the motor normally maintains the flexible gearing thereof with the power head in properly tensioned condition.

2. In a water system unit of the class described, a pumping mechanism including a pump head and a power head, a motor arranged in the space between the pump head and the power head and flexibly geared to the power head, a support for said motor including a pair of substantially triangular supporting brackets located at opposite sides of said pumping mechanism and arranged in inverted position with respect to the pumping mechanism so that the apex of each of said brackets is projected downwardly, an apex of each of said supporting brackets constituting the hinged point of connection of the brackets with said pumping mechanism, and means for connecting the supporting brackets to the pumping mechanism at such points, the center of gravity of the motor being in a different vertical plane from the hinged points of said supporting brackets, whereby the weight of the motor normally maintains the flexible gearing thereof with the power head in properly tensioned condition.

3. In a water system unit of the class described including a base, a pump head and a power head, the pump head and the power head being arranged on the base in spaced relation respecting each other, a motor arranged in the space between the pump head and the power head and flexibly geared to the power head, a support for said motor straddling the base and including a pair of supporting brackets one of which is arranged at each side of said base and hingedly connected thereto, and means for connecting the motor to said supporting brackets, the center of gravity of said support being in a different vertical plane from the center of gravity of the motor, whereby the weight of the motor normally maintains the flexible gearing thereof with the power head in properly tensioned condition.

4. In a water system unit of the class described including a base, a pump head and a power head, the pump head and the power head being arranged on the base in spaced relation respecting each other, a motor arranged in the space between the pump head and the power head and flexibly geared to the power head, a support for said motor straddling the base and including a pair of supporting brackets arranged at opposite sides of said base and hingedly connected thereto, fastening members associated with the motor, and means for connecting said fastening members to said supporting brackets, the center of gravity of said support being in a different vertical plane from the center of gravity of the mass of the motor, whereby the motor normally maintains the flexible gearing thereof with the power head in properly tensioned condition.

5. In a water system unit of the class described, the combination with a base, and a pump head and a power head arranged thereon in spaced relation to each other, of a support for said motor straddling the base and including a pair of supporting brackets arranged at opposite sides of said base between the pump head and the power head and capable of free rocking movement in relation to the base, the upper portions of said brackets extending above the plane of the pump head and the power head, means for hingedly connecting said brackets to said base to permit said free rocking movement thereof, a motor mounted on said brackets to rock therewith, and flexible gearing between said motor and said power head, the weight of the motor serving to rock the brackets away from the power head and thereby normally maintain said flexible gearing in properly tensioned condition.

6. In a water system unit of the class described, the combination with a base, and a pump head and a power head arranged thereon in spaced relation to each other, of a pair of triangular supporting brackets arranged at opposite sides of said base between the pump head and the power head and capable of free rocking movement in relation to the base, the upper portions of said brackets extending above the plane of the power head and the pump head and affording relatively broad supports thereat, the apex of each of said supporting brackets constituting the hinged point thereof, means for hingedly connecting said brackets to said base at the apex of each of the brackets to permit free rocking movement of the brackets on the base, a motor mounted on the upper portions of the brackets to rock therewith, and flexible gearing between said motor and said power head, the weight of the motor serving to rock the brackets away from the power head and thereby normally maintain said flexible gearing in properly tensioned condition.

LELAND G. KNAPP.